United States Patent
Schreiner et al.

(10) Patent No.: US 6,959,668 B2
(45) Date of Patent: Nov. 1, 2005

(54) METHOD AND APPARATUS FOR GENERATING STEAM FOR A COOKING DEVICE

(75) Inventors: Thomas Schreiner, Diedorf (DE); Peter Kohlstrung, Kaufering (DE); Bruno Maas, Landsberg am Lech (DE); Peter Wiedemann, Klosterlechfeld (DE); Elmar Junker, Germering (DE)

(73) Assignee: Rational AG, Landsberg/Lech (DE)

( * ) Notice: Subject to any disclaimer, the term of this patent is extended or adjusted under 35 U.S.C. 154(b) by 178 days.

(21) Appl. No.: 10/344,293
(22) PCT Filed: Aug. 8, 2001
(86) PCT No.: PCT/DE01/03034
§ 371 (c)(1), (2), (4) Date: Feb. 7, 2003
(87) PCT Pub. No.: WO02/12790
PCT Pub. Date: Feb. 14, 2002

(65) Prior Publication Data
US 2003/0192436 A1 Oct. 16, 2003

(30) Foreign Application Priority Data
Aug. 9, 2000 (DE) .......................................... 100 38 957

(51) Int. Cl.[7] ................................................. F22B 3/06
(52) U.S. Cl. ......................................... 122/26; 126/247
(58) Field of Search ............................ 122/7 R, 11–12, 122/26, 36, 387, 379; 126/247; 237/8 D, 9 B

(56) References Cited

U.S. PATENT DOCUMENTS

| | | | | | |
|---|---|---|---|---|---|
| 2,226,423 A | * | 12/1940 | Blake | ........................... | 122/26 |
| 3,791,349 A | * | 2/1974 | Schaefer | ....................... | 122/11 |
| 4,325,354 A | * | 4/1982 | Fuchs | .......................... | 126/247 |
| 4,721,066 A | * | 1/1988 | Newman et al. | ............... | 122/26 |
| 4,935,171 A | * | 6/1990 | Bracken | ...................... | 264/4.6 |
| 4,972,804 A | | 11/1990 | Stolmar | | |

FOREIGN PATENT DOCUMENTS

| | | |
|---|---|---|
| CH | 687 040 | 8/1996 |
| DE | 698319 | 10/1940 |
| DE | 904 653 | 1/1954 |
| DE | 2 214 566 | 10/1972 |
| DE | 27 57 913 | 6/1979 |
| DE | 37 83 361 | 7/1993 |
| DE | 690 13 906 | 6/1995 |
| DE | 692 07 830 | 9/1996 |
| FR | 880.494 | 3/1943 |

* cited by examiner

Primary Examiner—Gregory Wilson
(74) Attorney, Agent, or Firm—Marshall, Gerstein & Borun LLP

(57) ABSTRACT

A method and steam generator includes a steam generator container having a heated wall surface, an inlet for a liquid and an outlet for removing the vaporized liquid or steam, a rotor, which is mounted for rotation in the container and causes a rotational flow of the liquid outwardly against the heated wall to cause vaporization. During rotation of the rotor, outer edges of the blades of the rotor contact the wall surface to either abrade or wipe deposits, such as lime, from the wall surface.

33 Claims, 3 Drawing Sheets

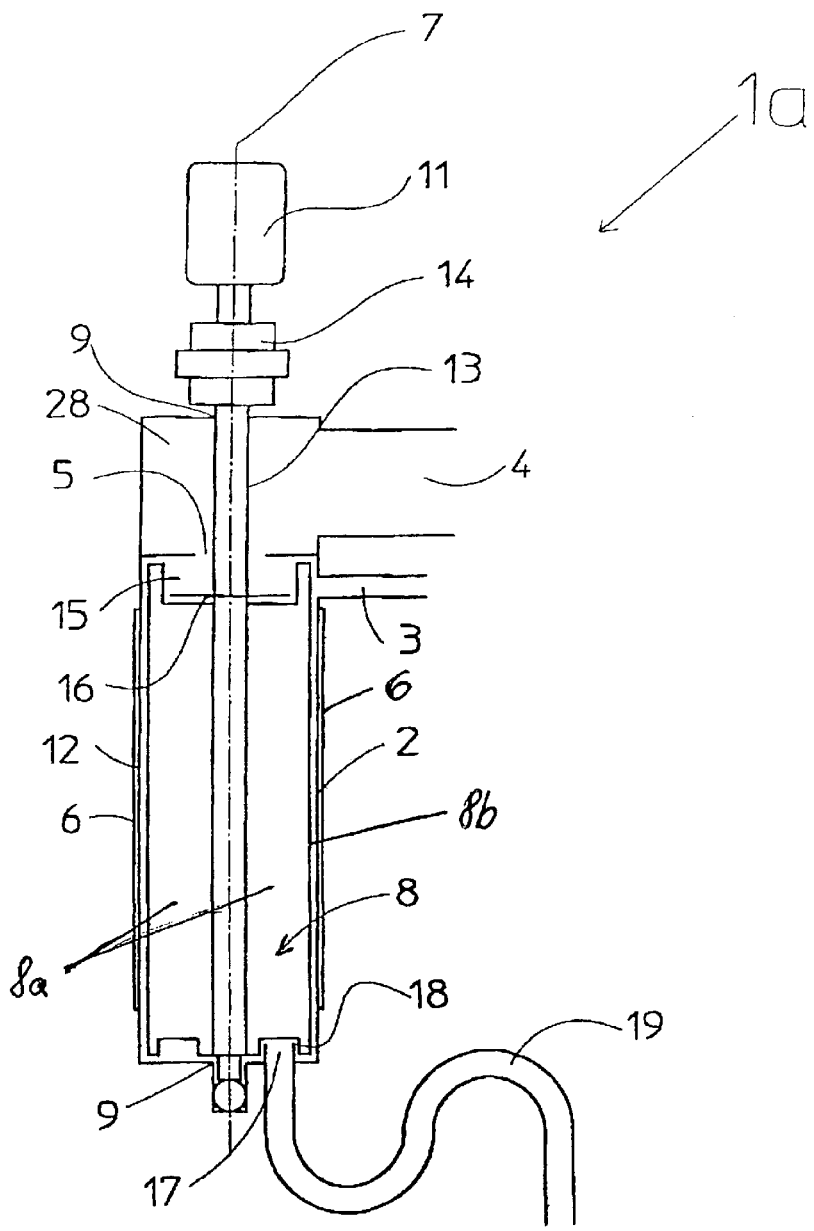
Figur 1

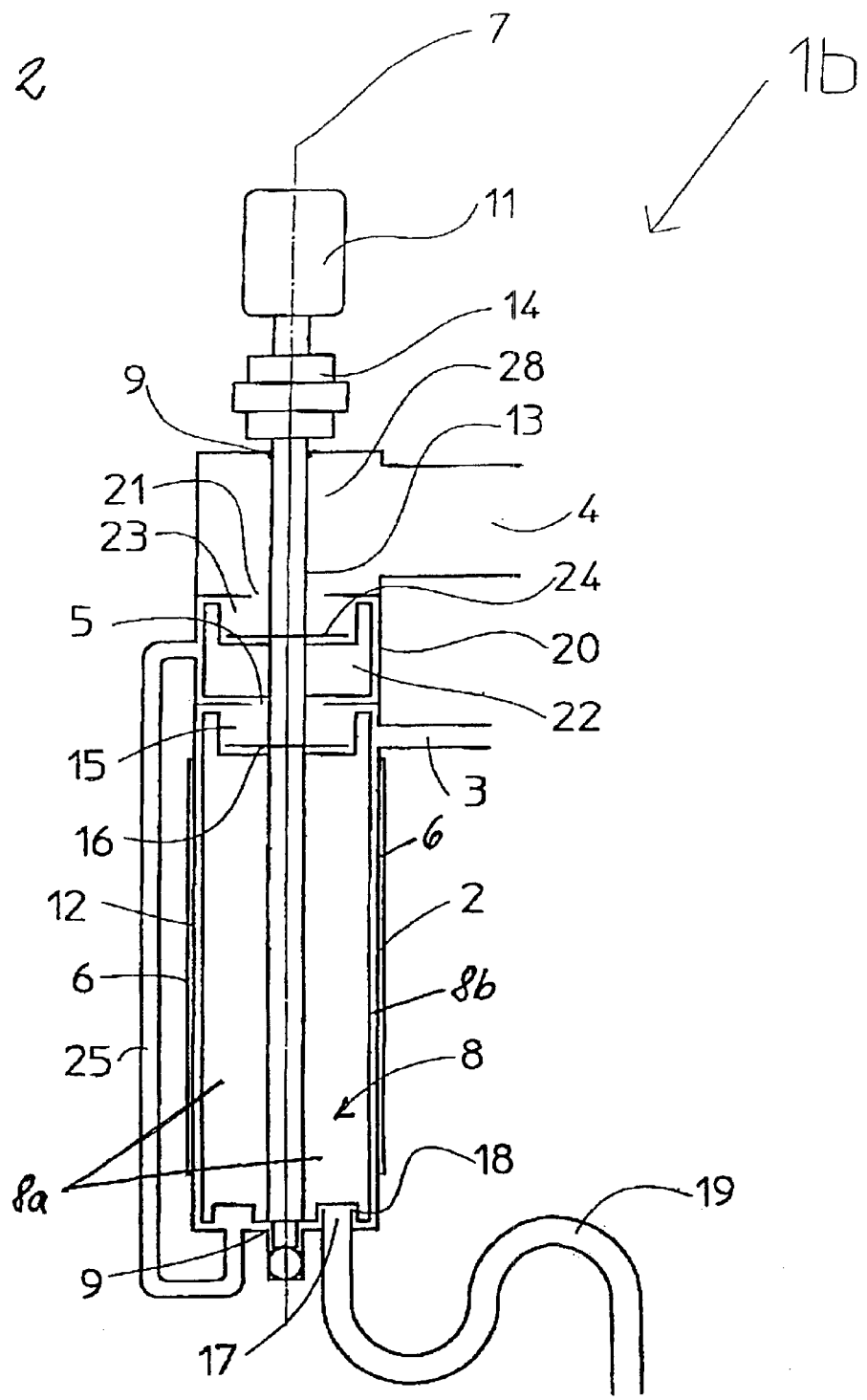
Figur 2

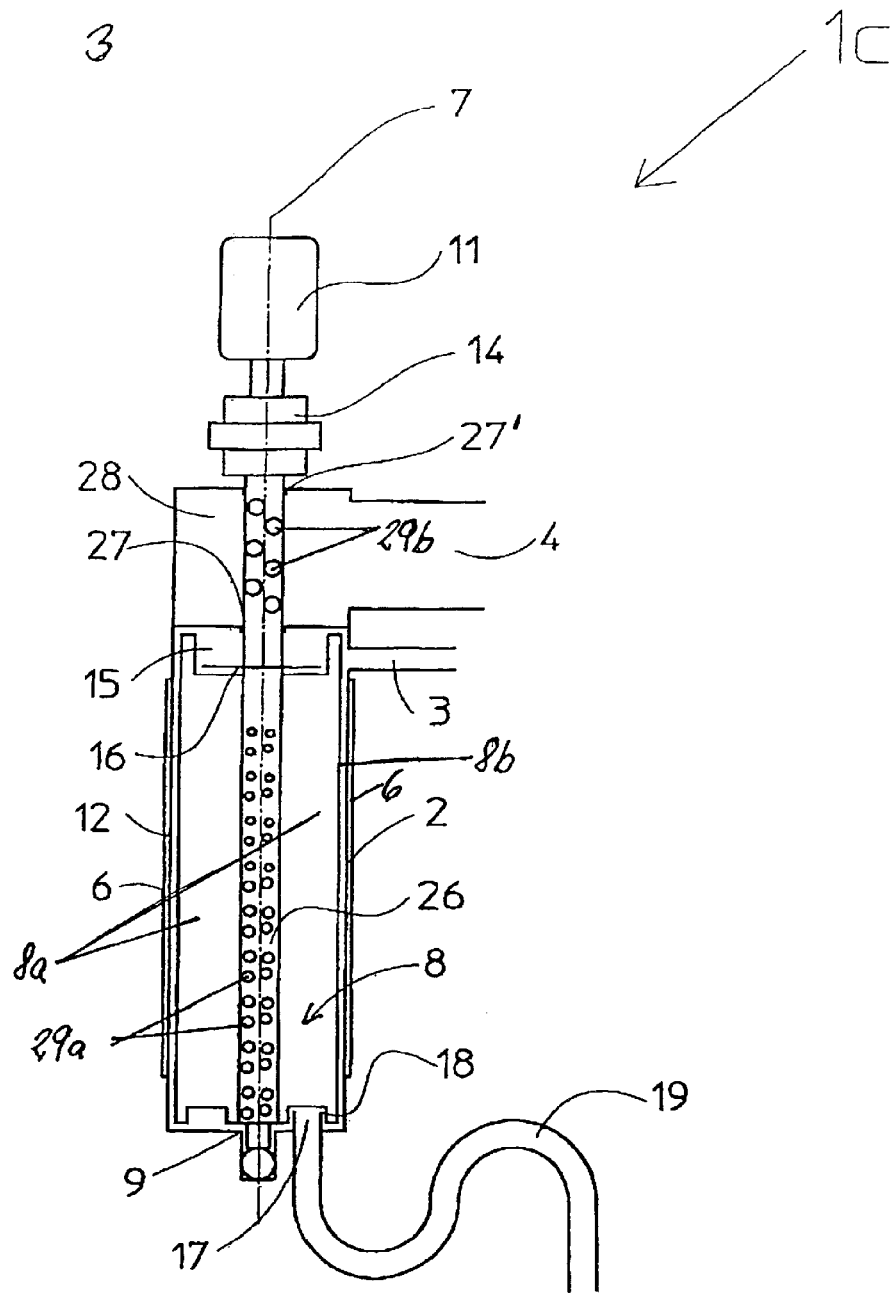

METHOD AND APPARATUS FOR GENERATING STEAM FOR A COOKING DEVICE

BACKGROUND OF THE INVENTION

The invention is directed to a method for generating steam, particularly for a cooking device, whereby a liquid within a steam generating vessel is caused to boil by a method of heating at least one heatable wall surface of the steam generating vessel, placing the liquid into rotation while being heated and pressing the liquid against the heatable wall surface due to centrifugal forces due to the rotation, allowing the steam arising due to a vaporization of at least a part of the liquid to escape from the steam generating vessel through a steam outlet and separating drops of the liquid entrained with the steam from the steam. The invention is also directed to an apparatus for generating steam, particularly for a cooking device, which apparatus comprises a steam generating vessel that can be at least partially filled with a liquid via an admission or inlet and from which steam can proceed to a steam outlet, and has a heating device for heating the liquid in the steam generating vessel for the purpose of generating steam.

Traditional steam generators as particularly employed in cooking devices usually comprise a boiler that is partially filled with water that is brought to a boil with heating elements. The space requirement of such a steam generator is mainly defined by two factors, which are the volume part that is filled with liquid water and the volume part of the gas space located above the water.

The first volume part is thereby limited by the size of the heating elements and the space required between the heating elements for the flooding thereof and for carrying off the steam bubbles. The size of the heating elements for a prescribed heating capacity is in turn defined by the Leidenfrost effect, in accord wherewith a specific surface power density of a heating element dare not be exceeded when heating a vaporizable liquid since a closed intermediate steam layer that impedes the heat emission otherwise forms between the surface of the heating element and the liquid. The Leidenfrost effect is nicely demonstrated in the phenomenon that drops of water do not immediately vaporize on a red-hot plate but first move in a quasi dancing motion since, carried by a steam layer that is formed, they move irregularly on the plate.

The second volume part is required in order to separate the steam from entrained drops of water. The size and design of the second volume part, i.e. of the gas space above the liquid, are critical for the quality of the steam. The steam quality is particularly determined by the size of the water surface that the stream of steam must pass. The emerging steam, namely, entrains all the more water the larger the stream of steam is per water surface.

Given traditional steam generators, thus, a high space requirements derives overall from the above considerations when a high steam quality is to be produced. Additionally, however, it must also be pointed out that the time required to make a known, water-filled steam generator operational is also dependent on the amount of water filled in that is required for reliably covering the heating elements, and this, in turn, makes demands of the size of the steam generator.

Steam generators wherein a rotational flow is induced in a steam-generating liquid by injecting a further liquid are known in the field of power plants, particularly nuclear power plants. The centrifugal forces accompanying the rotational flow are thereby used for the precipitation of contaminants, as disclosed by U.S. Pat No. 4,972,804 or, respectively, DE 690 13 906 T2.

Steam generators are also known wherein the entire tubular or barrel-shaped steam generator vessel is placed into rotation. This involves high energy and cost outlays and requires a great structural complexity that makes a rotating bearing of the steam generating vessel necessary, whereby an admission or, respectively, discharge of liquid is necessarily only practical via the axis of rotation. DE 2 214 566, for example, discloses such a rotating steam generator that is designed for the vaporization of organic drive fluids in a closed circulation of a Rankine motor. The steam generator disclosed by German Letters Patent 904 653 works similarly and this, however, additionally comprises a regulation for the supply of liquid for the purpose of creating a liquid ring having a specific thickness.

DE 27 57 913 A1 discloses a rotating steam generator with a rotatably seated boiler that structurally foregoes rotatable lead-throughs for the introduction or, respectively, removal of a liquid work medium.

DE 37 83 361 T2 discloses a tandem separator for a steam/water mixture, whereby helically coiled baffles place the steam/water mixture into rotation.

DE 692 07 830 T2 discloses a steam generator arrangement for ovens wherein thin water jets or, respectively, small drops of water, which are placed into rotation, descend onto a heating device in order to be vaporized.

The known steam generators, however, do not work satisfactorily for the vaporization of tap water but exhibit the serious disadvantage that the dissolved minerals which are contained in the tap water, particularly lime, will deposit at the walls and built-in parts of the steam generator. This can lead to the outage of or damage to the steam generator, which can usually only be prevented by a regular chemical decalcification. The post-operation maintenance jobs that become necessary as a result thereof are in turn cost-intensive.

SUMMARY OF THE INVENTION

It is therefore an object of the present invention to develop a method of the species as well as the apparatus of the species for generating steam such that the disadvantages of the Prior Art are overcome in that, in particular, small steam generators for outputting high-quality steam can be offered that are also quickly operational, cost-beneficial, flexibly heatable and dependable without tending toward defervescences and without requiring a regular decalcification.

The object of the invention is achieved in that the liquid is placed into rotation by at least one first rotor that is rotatably seated in the steam generating vessel.

It is thereby inventively proposed that the centrifugal forces of the liquid and/or of the steam are higher than the gravitational forces of the liquid and/or of the steam.

It can also be provided in the region wherein the drops of liquid are separated that the liquid and the steam are at least partially forced against at least one diaphragm, so that potential eddies are at least partially generated in the liquid and/or the steam and/or no heating of the heatable wall of the vessel occurs.

It is inventively proposed that contaminants of the liquid are eliminated in that the liquid is forced against at least one diaphragm.

It is also proposed that the liquid is supplied into the vessel with a minimum velocity, preferably directed onto the heatable wall surface and/or onto the first rotor.

Alternatively, it is proposed that the filling level of the vessel is identified, preferably from outside the vessel, by measuring a centrifugal force-induced pressure against at least one wall surface of the vessel.

An inventive method is characterized in that liquid condensed and/or vaporized in the steam escaping from the steam generating vessel is placed into rotation by a second rotor in at least one further or additional liquid separation vessel following the steam generating vessel, and any condensate is separated and discharged from the liquid separation vessel, and is preferably resupplied to the steam generating vessel.

It can thereby be provided that the first rotor in the steam generating vessel and the second rotor in the liquid separation vessel are placed in rotation via a motor, preferably via the rotational axis.

It is also provided that the steam is at least partially supplied to the steam outlet through a pipe arranged in the steam generating vessel, preferably in the form of a hollow shaft in communication with the rotor or, respectively, rotors.

It can be preferably provided that at least one of the first and the second rotor comprises an at least regionally abradant contact with the wall surface or deposits on the wall surface of the steam generating vessel or, respectively, liquid separation vessel at least during the rotation, and at least partially strips the deposits, particularly in the form of lime incrustations, from the wall surface.

It can thereby be provided that the distance between the first and/or second rotor and the appertaining wall surface is dimensioned so slight that a deposit being formed, particularly a lime incrustation, is eroded upon rotation of the first or, respectively, second rotor.

It is also proposed that the first and/or second rotor comprises or, respectively, comprise no contact with the corresponding wall surface in the idle condition and is pressed at least regionally in the direction of the corresponding wall surface due to centrifugal forces upon rotation.

It is also proposed that the wall surface and/or the rotor is or, respectively, are dry-heated after an operating phase and/or a wetting with liquid given rotating and/or idle rotor, whereby an adhesion of the rotor to the wall surface due to deposits is prevented.

It is also inventively proposed that the steam generating vessel empties, preferably automatically, in the idle condition of the first rotor, particularly via a vapor-tight waste water drain.

It can preferably be provided that the admission or inlet is made of a flexible material and is deformed by the pressure of the incoming fluid in order to at least partially strip deposits from the inlet.

Among other things, it is inventively proposed that the admission is cooled by a liquid stream that is continuously maintained via a control and/or regulating device, whereby the liquid is taken from a reservoir and/or from a feed conduit, and deposits are at least regionally prevented.

The invention is also directed to an apparatus for generating steam that is characterized by a first rotor in the steam generating vessel via which at least the liquid can be placed into rotation.

It is thereby provided that the vessel comprises two ends lying opposite one another, whereby the inlet and the steam outlet are either both arranged at one end or each is arranged at a different end.

It is also proposed that the steam generating vessel is rotationally symmetrical around an axis, preferably essentially tubularly, or is conically expanded from the inlet to the steam outlet.

An inventive apparatus can also be characterized in that the axis of the steam generating container coincides with the rotational axis of the first rotor, whereby the rotational axis preferably proceeds essentially parallel to the direction of the gravitational force.

It is also proposed that the heating device works with electrical heating coils, a gas burner, a heat exchanger, electrical induction, thermal radiation, direct or indirect flame charging, thick-film heating or an electrically conductive ceramic as material of the heatable wall surface of the steam generating vessel, whereby the outer surface of the steam generating vessel is enlarged, preferably by ribs, embossing and/or coils and/or the flow velocity of the combustion gas is increased.

The inventive apparatus is also characterized by at least one diaphragm for the elimination of drops of liquid entrained by the steam and/or contaminants in the liquid.

It is thereby also proposed that a first diaphragm is arranged downstream of the inlet and/or a second diaphragm is arranged upstream of the outlet.

An inventive apparatus can also be characterized by an opening for a preferably automatic emptying of the liquid given standstill of the rotor and/or by a third diaphragm in the region of the steam generating vessel with the least gravitation potential, whereby the opening is closed during rotation by a closure mechanism that preferably comprises a siphon trap.

It is also proposed that the first rotor can be driven by a motor via a shaft, whereby the shaft is, in particular, a hollow shaft with radial bores and/or slots that are arranged along the long side of the hollow shaft in order to enable a steam transfer from the steam generating vessel to the steam outlet.

Further, an inventive apparatus can be characterized by a liquid separation vessel between the steam generating vessel and the steam outlet, whereby a liquid return preferably proceeds from the liquid separation vessel to the steam generating vessel.

It can thereby be provided that a second rotor is rotatable in the liquid separation vessel, and is preferably mechanically coupled to the first rotor.

It can also be inventively provided that the first and/or the second rotor comprises a stripper device that strips deposits from at least regions of a wall surface of the steam generator vessel or, respectively, liquid separation vessel during rotation.

It can thereby be provided that the stripper device comprises brushes, lamellae, fringes and/or lips, which are preferably composed of foodstuff-fast, heat resistant material.

It is also proposed that the stripper device comprises a material reinforcement at least regionally at its side lying closest to the wall surface during rotation.

It is preferably inventively proposed that the stripper device comprises no contact with the wall surfaces in its idle condition but does upon rotation, preferably via employment of at least one spring system.

It can also be provided that the first and/or second rotor is or, respectively, are fashioned spirally, helically and/or star-shaped in the form of a paddle, which preferably has two paddle halves.

Finally, it is proposed that the rotor itself is implemented flexible, preferably in the form of brushes, lamellae, fringes and/or lips and exhibits no contact with the wall in its idle condition.

In that the invention is the first to have undertaken the step of rotating the built-in parts of the steam generating vessel instead of the steam generating vessel itself, the following advantages have, in particular, been achieved:

i) recusation of the mass moment of inertia, as a result whereof the energy requirement is reduced at the same time, response times are shortened, control times are shortened, bearing forces are reduced and balancing problems are reduced; and ii) simplification of the structure, for example by simplifying the installation and contacting of a heating device, as well as avoiding structurally complicated structures of a type that are standard given rotating outside vessels in order, among other things, to avoid rotatably implemented leads.

Overall, thus, the manufacturing and maintenance costs are reduced given a simultaneous enhancement of the use time.

Developments according to the invention are also based on the surprising perception that involved and cost-intensive maintenance work for decalcification at the steam generators becomes superfluous and that a maximum heat transfer from the walls to the liquid remains is assured during operation because the inside, rotating units function, so to speak, as a stripper device with which the deposits at the walls are instantaneously abraded during operation, i.e. during rotation.

Further features and advantages of the invention derive from the following description wherein three exemplary embodiments of the inventive apparatus are explained in detail on the basis of schematic drawings.

BRIEF DESCRIPTION OF THE DRAWINGS

FIG. 1 is a cross-sectional view through a first embodiment with rotor at rest;

FIG. 2 is a cross-sectional view through a second embodiment with rotor at rest; and FIG. 3 is a cross-sectional view through a third embodiment with rotor at rest.

DESCRIPTION OF THE PREFERRED EMBODIMENTS

As can be derived from FIG. 1, an inventive steam generator 1a comprises a steam generating vessel in the form of a tubular boiler 2 with an admission or inlet in the form of a water inlet 3 and a steam outlet 4 at the upper end of the boiler 2, a diaphragm 5, which diaphragm separates the boiler 2 from the steam outlet 4, for condensate and contaminant separation, heating elements 6 in the form of a thick-film heater surrounding the tubular boiler 2, and a rotor in the form of a paddle 8 rotatable around a rotational axis 7 that coincides with the longitudinal axis of the boiler 2. The paddle 8 is seated with two bearings 9 and is driven with a motor 11 via a clutch 14, which is intended to compensate for adjustment errors, and a shaft 13. The paddle 8 comprises two paddle halves 8a, which have respective long paddle sides or edges 8b neighboring the wall surface 12 of the boiler 2, a recess 15 in the region of the diaphragm 5 and an impact disk 16 in order to generate a potential eddy in front of the diaphragm 5. A waste water drain 17 is located at the lower end of the boiler 2, and it has a collar 18 in order to avoid water losses due to flowing in a boundary layer. The waste water drain 17 is closed only with a siphon trap 19 in order to avoid steam losses, so that the boiler 2 automatically empties given standstill of the paddle 8.

With the steam generator 1a described with reference to FIG. 1, water is supplied to the boiler 2 via the water inlet 3 and is placed in rotation by the paddle 8, which is rotating around the rotational axis 7 in order to force the water against the wall surface 12 of the boiler 2, which is heated via the heating elements 6, and leads to a fast and uniform heating of the water. At the same time, the paddle halves 8a that are held in their idle position shown in FIG. 1 by springs (not shown) and at whose long sides 8b fine, flexible lips (not shown) are located are pressed against the wall surface 12 of the boiler 2 due to the rotation. The pressing power is thereby dimensioned such that the lips wipe the wall surface 12 only lightly. Salt deposits, particularly lime incrustations, are thereby avoided. In addition, the long sides 8b can comprise reinforcements in order to achieve an optimally long-lasting stripping effect given low wear or with a flexible design of the rotor of the stripper device, the ends of the elastic lips of the sides 8b can be reinforced in order to increase the pressing power against the wall surface 12 during the rotation. Via the diaphragm 5, moreover, both contaminants of the water as well as drops of water entrained with the generated steam, which are forced against the wall surface 12 of the tubular boiler 2 due to the rotation of the paddle 8, are prevented from emerging from the steam outlet 4 together with the steam.

The geometry at the diaphragm passage or opening can be designed for enhancing the separation rate of the steam and the liquid so that a potential eddy that can be reinforced by the preceding impact disk 16 is induced.

Despite the counter-measures, an entrainment of drops of water due to high flow velocities can nonetheless occur given a small diameter of the boiler 2. In the embodiment of the inventive steam generator 1b described in FIG. 2, the boiler 2 is therefore followed by a water separation chamber 20 that again separates entrained water from the steam and that is limited by a second diaphragm 21 with an opening. A second paddle 22 rotates in this water separation chamber 20, which paddle 22 is driven by the same shaft 13 as the paddle 8 and likewise has a recess 23 and an impact disk 24 in order to generate a potential eddy. The drops of water separated from the steam due to the rotation generated by the paddle 22 are returned into the boiler 2 via a water return 25 in the form of a tube or hose conduit. All other components of the inventive steam generator 1b according to FIG. 2 correspond to the inventive steam generator 1a according to FIG. 1.

FIG. 3 shows another inventive steam generator 1c wherein additional measures are implemented in order to reduce the water entrainment given a small boiler diameter, and identical components of this generator are provided with identical reference characters. Here, the paddle 8 is driven by a hollow shaft 26 that simultaneously serves the purpose of conducting the generated steam out of the boiler 2. In order to move the steam into the inside of the hollow shaft 26, the latter must be provided with radial bores or slots 29a over its entire moistened length in the vaporizer space, i.e. the boiler 2. The diameters or density of the bores or slots 29a are varied in axial direction so that the flow-conditioned pressure drop in the hollow shaft 26 is compensated and, thus, the flow component in the direction of the rotational axis 7 in the boiler 2 outside the hollow shaft 26 is minimized, as is the entrainment of water at the same time. Outside the boiler 2, the steam can in turn be coupled out, for example, through further radial bores 29b in the hollow shaft 26 or through an axial opening (not shown) at the end of the shaft 26.

The shaft 26 is seated at the lower end of the boiler 2, whereby it can taper into a correspondingly thinner, solid shaft. At the upper end of the boiler 2, the hollow shaft 26 is conducted out of the boiler 2 through a seal or a vapor-tight bearing 27 into a steam discharge chamber 28 lying thereabove. In this steam discharge chamber 28 above the boiler 2, the hollow shaft 26 has the bores 29b in order to allow the generated steam to emerge in turn and be supplied to the steam outlet 4. The hollow shaft 26 is in turn conducted out at the other end of the steam discharge chamber 28 with a seal or vapor-tight bearing 27', and the hollow shaft 26 can merge into a thinner, solid shaft in or above the steam discharge chamber 28. Above the steam discharge chamber 28, the hollow shaft 26 is coupled to the motor 11 via a clutch 14 for compensating alignment errors between the motor shaft and the hollow shaft 26.

Additionally, the filling level of the steam generator 1a, 1b or 1c can be acquired by measuring a centrifugal force-induced pressure at the outside walls of the boiler 2.

A decalcification of an inventive steam generator 1a, 1b or 1c is effected by the flexible lips at the long paddle sides 8b of the paddle halves 8a that continuously erode the deposits from the outside wall during operation. The lips themselves do not thereby wear significantly since they themselves calcify in the region of immersion into the water film and it is thus mainly lime scraping against lime. However, an excessive amount of lime can also not collect at the paddle 8 since this is driven outward by the centrifugal force and is ultimately scraped off thereat. The lime meal that occurs must merely be removed from the boiler by being regularly rinsed or, respectively, by changing the water. The employment of flexible lips as stripper device or the flexible design of the rotor in and of itself yields the advantage that no adhesion of the rotor to the wall surface 12 can occur in the idle condition due to potentially existing deposits since the centrifugal force upon rotation produces the contact of the rotor or the stripper device with the wall surface 12. In order to enable an automatic emptying, the lower end of the boiler 2 can be provided with an additional diaphragm or a closure mechanism (not shown). The diaphragm 5 can thereby be combined with just such a diaphragm upstream of the steam outlet 4.

Both individually as well as in arbitrary combination, the features of the invention disclosed in the above specification, in the claims as well as in the drawings can be critical for realizing the various embodiments of the invention.

What is claimed is:

1. A method for generating steam comprising the steps of providing a steam generating vessel having an outer wall, a liquid inlet and an outlet, at least a first rotor mounted for rotation in the steam vessel, and a drive for rotating the rotor, heating the wall surface of the steam-generating vessel, adding liquid through the inlet, rotating the rotor to place the liquid in rotation and to press it against the heated wall surface, separating any entrapped drops in the steam before it exits the outlet and removing deposits on the wall surface of the steam-generating vessel by an outer edge of the rotor lightly engaging said wall surface.

2. A method according to claim 1, wherein the step of rotating the rotor creates centrifugal forces on the liquid and any steam, which centrifugal forces are higher than the gravitational forces of the liquid and steam.

3. A method according to claim 1, wherein the step of separating includes at least partially forcing the liquid and steam against at least one diaphragm to create potential eddies in the liquid and steam and against non-heated wall portions of the vessel.

4. A method according to claim 3, wherein the step of at least partially forcing the steam and liquid against a diaphragm eliminates contaminants of the liquid.

5. A method according to claim 1, wherein the step of adding liquid into the vessel adds the liquid as a stream with a minimum velocity directed onto one of the heated wall surface and first rotor.

6. A method according to claim 1, which includes determining the filling level of the vessel by measuring the centrifugal force-induced pressure against at least one wall surface of the vessel.

7. A method according to claim 1, wherein the step of providing the steam generator provides a steam generator with a liquid-separation vessel with a second rotor located downstream from the first rotor, said second rotor being mounted on the drive shaft for the first rotor and includes placing the steam and liquid escaping the steam-generating vessel into rotation by the second rotor to further separate liquid from the steam and then discharging the steam free of liquid from the vessel.

8. A method according to claim 7, wherein the first rotor and the second rotor are placed in rotation via the same drive arrangement.

9. A method according to claim 7, wherein the second rotor includes a regionally abradant contact with the surface of the liquid separation vessel at least during its rotation and at least partially strips the deposits from the wall surface.

10. A method according to claim 7, wherein the distance between the second rotor and the wall surface is dimensioned so slight that the deposits being formed are eroded by rotation of the second rotor.

11. A method according to claim 7, wherein the first and second rotors have no contact with the corresponding wall surface while in an idle condition and are pressed radially outward into contact with the wall surface by centrifugal force caused by said rotation.

12. A method according to claim 1, wherein the steam generator includes a hollow shaft in communication with the rotor and with the steam outlet and the method includes drawing steam into said hollow shaft and discharging it at the steam outlet free of droplets of liquid.

13. A method according to claim 1, which includes preventing adhesion of the rotor to the wall surfaces due to deposits by dry-heating at least the wall surfaces after an operating phase or a wetting of the walls with a liquid.

14. A method according to claim 1, wherein stopping rotation of the rotor automatically empties the steam-generating vessel via a vapor-tight waste water drain.

15. A method according to claim 1, which includes providing an inlet made of a flexible material, which is deformable, so that the pressure of incoming fluid through the inlet at least partially strips deposits from said inlet.

16. A method according to claim 1, which includes regulating and controlling a fluid stream entering the inlet to cool the inlet and to prevent deposits thereon.

17. An apparatus for generating steam, said apparatus comprising a steam-generating vessel having an inlet for receiving a liquid and an outlet through which steam can escape, a heating device for heating liquid in the steam-generating vessel, at least one first rotor being mounted in the steam-generating vessel, an arrangement for rotating said rotor so that liquid in the steam-generating vessel is placed into rotation and forced against a wall surface of the steam-generating vessel, said first rotor including a stripper device that at least regionally strips deposits from a wall surface of the steam-generating vessel during rotation thereof.

18. An apparatus according to claim 17, wherein the vessel includes two ends lying opposite one another and the inlet and outlet are disposed in at least one of said ends.

19. An apparatus according to claim 18, wherein the steam-generating vessel has a rotationally symmetric wall surface extending between said ends.

20. An apparatus according to claim 19, wherein an axis of the steam-generating vessel coincides with the rotational axis of said rotor, so that the rotational axis preferably proceeds essentially parallel to the direction of gravitational force.

21. An apparatus according to claim 17, wherein the heating device is selected from a group consisting of electrical heating coils, gas burners, heat exchangers, electrical induction, thermal radiation, direct flame charging, indirect flame charging, thick-film heating, and an electrically conductive ceramic material as a heatable wall surface for the steam-generating vessel and an outer surface of the steam-generating vessel being enlarged by elements selected from ribs, embossments and coils.

22. An apparatus according to claim 17, which includes at least one diaphragm for elimination of drops of liquid entrained by the steam.

23. An apparatus according to claim 22, wherein the at least one diaphragm is arranged downstream of the inlet and a second diaphragm is arranged between the first-mentioned diaphragm and the outlet.

24. An apparatus according to claim 17, which includes an opening for automatically emptying the liquid from the steam-generating vessel during standstill of the rotor, said opening being closed during rotation by a closing mechanism including a siphon trap.

25. An apparatus according to claim 17, wherein the rotor is driven by a motor via a shaft, said shaft being a hollow shaft with radial openings arranged along the length of the shaft in order to enable steam transfer from a steam-generating vessel to the steam outlet.

26. An apparatus according to claim 17, which includes a liquid separation vessel between the steam-generating vessel and the steam outlet, a liquid return proceeding from the liquid separation vessel back to the steam-generating vessel.

27. An apparatus according to claim 26, wherein a second rotor is rotated in the liquid separation vessel and is coupled for rotation with the first-mentioned rotor.

28. An apparatus according to claim 27, wherein the second rotor includes a stripper device that strips deposits from at least regions of the wall of the separation vessel during rotation.

29. An apparatus according to claim 17, wherein the stripper device is selected from a group consisting of brushes, lamellae, fringes and lips.

30. An apparatus according to claim 17, wherein the stripper device comprises a material reinforcement at least regionally on a side lying closest to the wall surface during rotation.

31. An apparatus according to claim 17, wherein the stripper device has no contact with the wall surface during an idle condition of the rotor, but upon rotation of the rotor, moves into engagement with the wall surface.

32. An apparatus according to claim 17, wherein the rotor is fashioned from a group consisting of spiral rotors, helical rotors, star-shaped rotors having paddles preferably with two paddle halves.

33. An apparatus according to claim 17, wherein the rotor is formed of a flexible material selected from brushes, lamellae, fringes and lips and has no contact with the wall while in an idle condition.

* * * * *